…

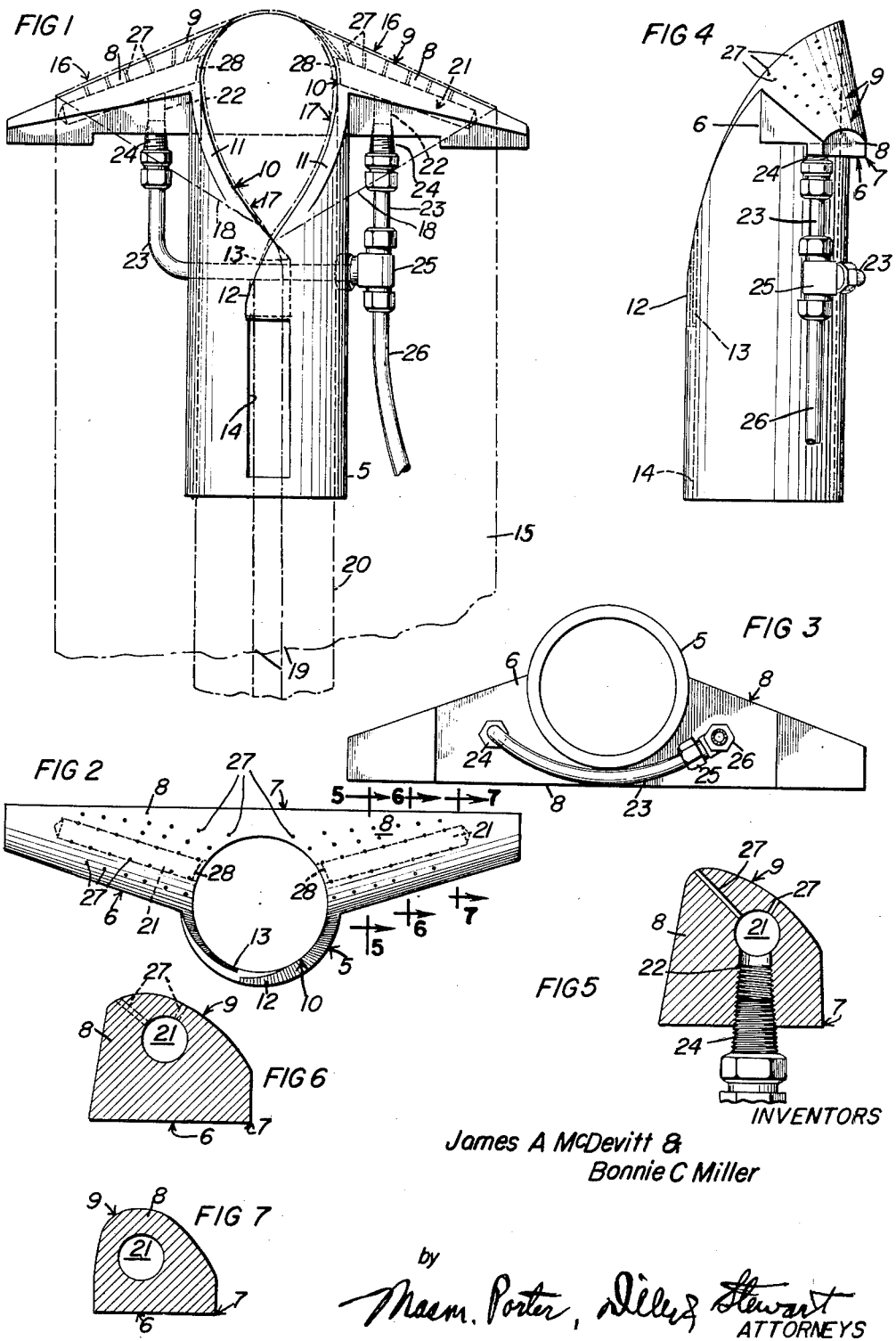

United States Patent Office 3,042,103
Patented July 3, 1962

3,042,103
PLASTIC FILM TUBE FORMER
James A. McDevitt and Bonnie C. Miller, Mount Vernon, Ohio, assignors to Continental Can Company, Inc., New York, N.Y., a corporation of New York
Filed Sept. 30, 1958, Ser. No. 764,424
6 Claims. (Cl. 156—466)

The invention relates generally to the formation of tubes from continuously moving web material and primarily seeks to provide a novel tube former which, while subject to more general usage, is particularly adaptable to the formation of tubes from webs of polyethylene or comparable plastic films.

Tube formers of the character stated are known and are in general use in machine structures wherein a plastic web is continuously drawn over a stationary former effective to shape the web into a tube by bringing the web into tubular shape with edges overlapping in the form of a side seam. In known machines, an example of which is disclosed in U.S. Letters Patent 1,986,422, issued to Walter R. Zwoyer on January 1, 1935, the formed tube is divided into individual pouch or package sections by cross sealing and cutting, and fill is introduced into successively formed punch sections through the web former and prior to the final closing or sealing and cutting off of the individual pouch or package sections. It has been common practice heretofore to ues cellophane in this form of packaging, but now there is an ever increasing demand for the use of polyethylene film in the formation of the packages. However, because of its greater limpness and poorer surface slip, as compared to cellophane, great difficulty has been encountered in attempts to form packages from polyethylene film in machines designed for the use of cellophane. It is a purpose of the present invention to provide a tube former which will operate very efficiently in general use formation of tubing from continuously moving web material and which may be substituted for known formers in machines of the character stated and will eliminate the difficulties previously encountered in the use of such machines when it was attempted to form tubes therein from polyethylene film.

An object of the invention is to provide a tube former of novel construction having provision for introducing compressed air into the interior thereof and directing the same outwardly over the exterior surfaces contacted by the film as it is being shaped from a moving web into tubular form, the air serving to provide an air cushion between the former and the film and prevent objectionable clinging of the film to said former surfaces.

With the above and other objects in view that will hereinafter appear, the nature of the invention will be more clearly understood by reference to the following detailed description, the appended claims and the several views illustrated in the accompanying drawing.

In the drawing:

FIGURE 1 is a front elevation illustrating the improved tube former, a plastic film being illustrated as in the process of being formed over the former in dot and dash lines.

FIGURE 2 is a top plan view of the structure shown in FIGURE 1.

FIGURE 3 is an inverted plan view of the structure illustrated in FIGURE 1.

FIGURE 4 is a right side elevation of the structure illustrated in FIGURE 1.

FIGURES 5, 6 and 7 are detail vertical cross sections taken respectively on the lines 5—5, 6—6 and 7—7 on FIGURE 2.

The improved former includes a cylindrical tubular body 5 carrying a head 6 at one side of its upper end extremity, as will be apparent by reference to FIGURES 2 and 4. The head has a straight edge or wall portion 7 for initial engagement by the web to be formed, and it also includes laterally extending shoulders 8 having downwardly sloping, smoothly rounded upper surfaces 9, as will be apparent by reference to FIGURE 1 and the sectional views illustrated in FIGURES 5, 6 and 7.

The tubular body 5 opens upwardly through the head through a smoothly rounded throat 10 which slopes forwardly and downwardly and is generally ovate in shape as will be apparent by reference to FIGURES 1 and 4. The shoulders of the throat opening from the head and the body into the ovate throat opening are well rounded, this smooth shaping being generally indicated at 11. The body also is shaped to present an outer overlap portion 12 and an inner underlap portion 13 above a cutout or opening 14. It will be apparent by reference to FIGURE 1 that the upwardly travelling web portion 15 is drawn over the shoulders at 16 and down into the throat at 17, the edges angling inwardly and downwardly at 18—18 and being overlapped by the portions 12 and 13 in the form of a side seam 19 in the well known manner. In other words, the downwardly sloping edge portion at the left viewed in FIGURE 1 turns inwardly and downwardly over the underlap portion 13 interiorly of the tubular body 5, and the downwardly sloped portion 18 as as viewed at the right in FIGURE 1 turns inwardly and downwardly over the overlap portion 12 between said overlap portion and the underlap portion 13, entering the tubular body 5 through the opening 14 and lying against the previously mentioned edge portion outwardly or in front thereof to complete the side seam as indicated at 19.

It will be apparent from the foregoing that so long as the plastic film tube 20, formed in the manner above described, is drawn downwardly as viewed in FIGURE 1 by means not shown but well known in the art, the shaping of the web 15 into the desired tube will continue.

In order to equip the former for use in the shaping of various films, including polyethylene or comparable plastic films, without objectionable frictional contact of the film or clinging thereof to the former surfaces, the shoulders 8 are bored at 21 to provide air manifolds, and a cross bore 22 enters upwardly into each manifold bore and has a compressed air supply line 23 tapped thereinto at 24. The lines 23 connect through a T-coupling 25 with a common supply line 26 leading to a source of compressed air (not shown). Air ducts 27 lead upwardly and outwardly from the manifold bores 21 through the sloping and well rounded surfaces of the shoulders 8 as clearly illustrated in FIGURES 1, 2 and 5 through 7. It will be apparent by reference to FIGURE 2 that the duct outlets are arranged in multiple longitudinal and transverse rows, the transverse rows being arcuately arranged with the arcs in concentric relation and struck from the axis of the tubular body 5, as viewed in FIGURE 2. It will be noted that the uppermost longitudinal rows of duct outlets or orifices, as viewed in FIGURE 2, are located on the shoulder contours where the flat web 15 starts to roll over the well rounded contours of the shoulders, and the innermost of the arcuately arranged rows of orifices are disposed to closely encircle the entrance into the tubular body throat off the shoulders, this being the area where the web, in the process of being formed into a tube, breaks into the interior of the tubular body. The inner ends of the manifold bores 21 are plugged as at 28 so that all of the air directed into the manifold bores must pass out through the delivery ducts 27.

The compressed air is provided at a pressure which will give just the right cushioning effect to facilitate passage of the film 15 over the former during the formation thereof into a tube without any tendency on the part of the film to engage in objectionable frictional contact with, or clinging to, the forming surfaces. The pressure of the air is adjusted to a degree which will provide full desired cushioning action without any ballooning of the film off the shoulders and other forming surfaces. It has been found that the provision of air at 5 or 6 p.s.i. pressure will suffice, but this pressure may be varied in accordance with materials used in the construction of the former and the nature of the films being shaped.

A preferred structure has been disclosed herein, but it is to be understood that variations in the shaping of the former and in the air pressure orifice arrangement may be made without departing from the spirit of the invention as defined in the appended claims.

We claim:

1. A tube former for forming a tube from a flat web, said tube former comprising an elongated head adapted to be generally horizontally mounted, a tubular body depending from said head intermediately of the ends of said head and opening upwardly through said head in the form of a web receiving and shaping throat, said head having a lower rear straight edge portion for initial contact with a flat web and rounded outwardly and downwardly sloping upper shoulders for aiding in reversing the direction of movement of an upwardly moving web, said throat being defined in part by overlap and underlap portions for turning web edge portions as a web is drawn downwardly through said body into an overlapped side seam to complete the formation of a web into a tube conforming generally in shape to the interior of said body, and means for directing air under pressure out through said shoulders to provide an air cushion web support for a web passing over said head.

2. A tube former as defined in claim 1 wherein the air directing means includes manifold means in the head, means for supplying air under pressure to the manifold means, and air delivery ducts opening outwardly from the manifold means through the shoulders of the head.

3. A tube former as defined in claim 1 wherein the air directing means includes manifold means in each shoulder, means for supplying air under pressure to the manifold means, and air delivery ducts opening outwardly from the manifold means through said rounded and sloping shoulders at spaced intervals throughout a major part of the length of each thereof and partially around the throat at the entrance thereinto off said shoulders.

4. A tube former as defined in claim 1 wherein the air directing means includes manifold means in each shoulder, means for supplying air under pressure to the manifold means, and air delivery ducts opening outwardly from the manifold means through said rounded and sloping shoulders at spaced intervals throughout a major part of the length of each thereof in spaced concentric arcuate rows with the arcs struck from a center on the axis of the tubular body and with one arcuate row of ducts on each shoulder disposed at the entrance into the throat off the particular shoulder.

5. A tube former for forming a tube from a flat web, said tube former comprising a generally horizontally disposed head having a lower rear straight edge for initially engaging a flat web and well rounded outwardly and downwardly sloping upper shoulders for aiding in reversing the direction of movement of an upwardly moving web, a tubular body depending from said head intermediate the ends of said head, said tubular body opening upwardly through said head in the form of a throat defined in part by overlap and underlap portions for turning edge portions of a web passing up and over said head and down through said body into an overlapped side seam, an air manifold in each of said shoulders, air delivery ducts opening outwardly through said shoulders, and means for constantly supplying air to said manifold during a tube forming operation to form a constant air cushion above said shoulders.

6. The tube former of claim 5 wherein said air delivery ducts are spaced throughout a major portion of the length of each shoulder in spaced concentric arcuate rows with the arcs struck from a center on the axis of said tubular body and with one arcuate row of ducts on each shoulder disposed at the entrance into said throat off the particular shoulder.

References Cited in the file of this patent

UNITED STATES PATENTS

| | | |
|---|---|---|
| 2,113,658 | Lasko | Apr. 12, 1938 |
| 2,145,941 | Maxfield | Feb. 7, 1939 |
| 2,164,702 | Davidson | July 4, 1939 |
| 2,195,583 | Schultz et al. | Apr. 2, 1940 |
| 2,272,530 | Patterson | Feb. 10, 1942 |
| 2,509,715 | Allen et al. | May 30, 1950 |
| 2,587,211 | Piazze | Feb. 26, 1952 |
| 2,696,244 | Jackson | Dec. 7, 1954 |
| 2,732,882 | Kuts | Jan. 31, 1956 |
| 2,848,820 | Wallin et al. | Aug. 26, 1958 |
| 2,899,875 | Leasure | Aug. 18, 1959 |
| 2,984,398 | Chalmers | May 16, 1961 |